(12) United States Patent
Postnikov et al.

(10) Patent No.: US 11,506,328 B2
(45) Date of Patent: Nov. 22, 2022

(54) PIPE HEAT INSULATION CASING AND ERECTION METHOD

(71) Applicant: JOINT-STOCK COMPANY "ATOMENERGOPROEKT", Moscow (RU)

(72) Inventors: Boris Alekseevich Postnikov, Moscow (RU); Evgenij Borisovich Mishin, Moskovskaya obl. (RU); Zinaida Semenovna Kazachkova, g. Moscow (RU); Dmitrij Alekseevich Vorobev, Moskovskaya obl. (RU); Elena Aleksandrovna Nikitina, Moskovskaya obl. (RU)

(73) Assignees: JOINT-STOCK COMPANY "ATOMENERGOPROEKT", Moscow (RU); JOINT STOCK COMPANY "SCIENCE AND INNOVATIONS", Moscow (RU)

(*) Notice: Subject to any disclaimer, the term of this patent is extended or adjusted under 35 U.S.C. 154(b) by 0 days.

(21) Appl. No.: 16/627,742

(22) PCT Filed: Dec. 28, 2018

(86) PCT No.: PCT/RU2018/000896
§ 371 (c)(1),
(2) Date: Dec. 30, 2019

(87) PCT Pub. No.: WO2020/046164
PCT Pub. Date: Mar. 5, 2020

(65) Prior Publication Data
US 2021/0332933 A1    Oct. 28, 2021

(30) Foreign Application Priority Data
Aug. 29, 2018    (RU) .......................... RU2018131159

(51) Int. Cl.
*F16L 9/14*    (2006.01)
*F16L 59/10*    (2006.01)
(Continued)

(52) U.S. Cl.
CPC ............. *F16L 59/10* (2013.01); *F16L 59/143* (2013.01); *G01M 3/18* (2013.01); *F16L 2201/30* (2013.01)

(58) Field of Classification Search
CPC ..... F16L 59/10; F16L 59/143; F16L 2201/30; G01M 3/18
(Continued)

(56) References Cited

U.S. PATENT DOCUMENTS 1,713,881 A  *  5/1929  Seifert .................. B21C 37/101
                                                       29/469
2,342,058 A  *  2/1944  Morris .................... E04F 17/02
                                                       52/249

(Continued)

*Primary Examiner* — James F Hook
(74) *Attorney, Agent, or Firm* — J. Miguel Hernandez; James R. Gourley; Carstens, Allen & Gourley, LLP

(57) ABSTRACT

The invention relates to pipelines and equipment useful in nuclear power plants, heat power engineering, manufacturing engineering, petrochemistry, water supply, chemical and aerospace industries, and other fields. The invention relates to a pipe heat insulation casing consisted of metal elements and assembly method ensuring reliable electrical insulation of all elements. The connection of the metal elements is with lapping, the elements are with openings in the lapping area where the electrically-insulating spacers are set made of resilient, elastic-plastic, plastic, fully viscous or partially solidified material ensuring electrical insulation between the adjacent elements. The electrically-insulating spacers are applied to the lapping areas of the metal elements to fill the openings of the lapping areas thus arranging reliable pin connections between the spacer and adjacent casing elements. Multiple pin connections ensure fixation of the (Continued)

adjacent metal elements without any failure to electrical insulation of each other.

15 Claims, 4 Drawing Sheets

(51) Int. Cl.
  *F16L 59/14* (2006.01)
  *G01M 3/18* (2006.01)
(58) Field of Classification Search
  USPC .................................. 138/149, 155, 159
  See application file for complete search history.

(56) References Cited

U.S. PATENT DOCUMENTS

| | | | | |
|---|---|---|---|---|
| 2,761,949 | A * | 9/1956 | Colton | F16L 59/22 |
| | | | | 285/133.11 |
| 3,453,716 | A * | 7/1969 | Cook | F16L 59/22 |
| | | | | 285/133.11 |
| 3,486,533 | A * | 12/1969 | Doherty | F16L 59/12 |
| | | | | 138/147 |
| 3,770,556 | A * | 11/1973 | Evans | B29C 61/10 |
| | | | | 156/218 |
| 3,882,382 | A * | 5/1975 | Johnson | G01N 27/048 |
| | | | | 138/104 |
| 4,095,937 | A * | 6/1978 | Colburn | F27D 3/02 |
| | | | | 138/144 |
| 4,120,325 | A * | 10/1978 | de Putter | F16L 9/125 |
| | | | | 285/55 |
| 4,221,239 | A * | 9/1980 | Reale | F16L 59/182 |
| | | | | 285/425 |
| 4,287,245 | A * | 9/1981 | Kikuchi | F16L 59/024 |
| | | | | 428/317.5 |
| 4,502,370 | A * | 3/1985 | Baileys | F23J 13/025 |
| | | | | 126/307 R |
| 5,020,481 | A * | 6/1991 | Nelson | F24H 1/182 |
| | | | | 122/494 |
| 5,370,530 | A * | 12/1994 | Facco | F27D 3/026 |
| | | | | 138/147 |
| 5,441,083 | A * | 8/1995 | Korsgaard | B65D 90/06 |
| | | | | 138/147 |
| 6,635,322 | B1 * | 10/2003 | Korsgaard | F16L 59/14 |
| | | | | 138/140 |
| 6,761,187 | B1 * | 7/2004 | Zoellner | B29C 66/112 |
| | | | | 285/21.2 |
| 2010/0206418 | A1 * | 8/2010 | Wolf | F16L 13/103 |
| | | | | 138/155 |
| 2010/0212807 | A1 * | 8/2010 | Princell | B29C 65/48 |
| | | | | 156/196 |

* cited by examiner

PIPE HEAT INSULATION CASING AND ERECTION METHOD

CROSS-REFERENCE TO RELATED APPLICATIONS

This application is a US 371 application from PCT/RU2018/000896 filed Dec. 28, 2018, which claims priority to Russian Application No. 2018131159 filed Aug. 29, 2018, the technical disclosures of which are hereby incorporated herein by reference.

FIELD OF THE INVENTION

The group of inventions relates to pipelines and equipment and shall be used in different fields of the invention: nuclear power plants, heat power engineering, manufacturing engineering, petrochemistry, water supply, chemical and aerospace industries, as well as other fields.

BACKGROUND OF THE INVENTION

There are high requirements to pipe heat insulation including increased strength of the covering casing in combination with possibility of detection and control over pipe leakages during operation. Taking the above mentioned into account the pipe components shall be made of conductive material for further monitoring of electrical resistance of the heat insulation located in a separate component area. Therein, the connections between the components shall be made of nonconductive material thus ensuring adequate strength of component connections.

There is a well known arrangement of metal heat insulation casing divided by the elements cut lengthwise with fasteners coupling band with clamping (USSR patent for invention SU 617024, IPC) F16L 59/12, priority 9 Aug. 1973, published 25 Jul. 1978, "Insulated section").

Such arrangement of the metal heat insulation casing is not reasonably reliable and does not provide electrical insulation for the metal casing elements.

There is a well known arrangement of the heat insulation casing in the form of cylindrical sheath consist of pipe halves with lateral boards bent outwards at an angle of 90° with rectangular openings from one side and with bent leaves included from another side (inventor's certificate USSR SU 1149099, IPC: F16L 59/14 primary right 25.02.1983, published 7 Apr. 1985, "Protective sheath")

Such arrangement of the metal heat insulation casing expands general dimensions of the heat insulated construction. Reliability of the arrangement with bent leaves is not high, as these leaves may lose strength and break away in case of multiple assembly and disassembly of the casing for some reasons which may make further operation impossible. Moreover, such arrangement does not provide electrical insulation for the metal casing elements.

There is a well known arrangement of the heat insulation casing in the form of metal cylindrical sheath closed with the opposite rims lapping by each other which has one of the rims with leaves bent in pairs across the sheath and another rim with openings with belts going through them in front of each of the leave pairs (inventor's certificate USSR SU 1476237, IPC: F16L 59/14 primary right 26.02.1987, published 30 Apr. 1989, "Protective heat insulation sheath")

Such arrangement of the metal heat insulation casing requires high accuracy during production (the leaves shall go through exactly via the openings). Therefore, assembly of the casing with leaves considers to be rather labour-consuming. The leaves being a part of the casing may lose strength and break away in case of multiple assembly and disassembly of the casing for some reasons which may make further operation impossible. Moreover, such arrangement does not provide electrical insulation for the metal casing elements.

There is also known arrangement of the heat insulation casing (covering) installed in heat-insulating layer in the form of cylinders (with one connector) or semi-cylinders (with two connectors) which are outsized 30 . . . 50 mm to lapping of the longitudinal welds with self-tapping screws in longitudinal and transverse welds. (G. F. Kuznetsov "Heat insulation" edited By G. F. G. Kuznetsov (Constructor's guidance)—4th edition, revised and enlarged—M.: Stroyizdat, 1985.-421p.)

Essential features of this technical solution are as follows: firstly, the metal cover installed in heat-insulating layer is arranged in the form of cylinders (with one connector) or semi-cylinders (with two connectors). Semi-cylinders are used for the heat insulation covering of the pipes with big dimensions etc. wherein the cylinders (shells) made of a sheet with length equal to the length insulation circumference outsized 30 . . . 50 mm to lapping of the longitudinal weld; semi-cylinders are made of a sheet with length equal to the length of insulation semi-circumference double outsized to the longitudinal welds. The length of the article in both cases shall be determined by a size of the sheet which is used for its production. Secondly, the arrangement of the casing made of the metal sheets is applicable for horizontal pipelines self-tapping screws for fastening, where self-tapping screws are set in longitudinal and transverse welds.

The drawback of this technical solution is related to the contact of the adjacent metal sheets which form a heat insulation casing construction as well as application of the self-tapping screws set in transverse welds do not provide electrical insulation for separate elements of the casing.

There are also known different erection methods for heat insulating casings on pipes with application of insulating materials. For example, there is one known method for pipe heat insulation for air, above and under ground installation (RF patent for invention No. 2386076, published 20 Nov. 2009, IPC F16L 59/14, F16L 59/10), wherein they install the prefabricated sections of light-gage rolled metal shells, which serve as forms and protection heat insulation coverings, concentrically with reference to the insulating pipe, fill the annulus between the pipe and the shell with polyurethane foam via longitudinal joint located in the shell open state, close the longitudinal joint of the shell with lapping of the edges and wait for structure formation of the heat insulation material. Such method allows to protect the pipe heat insulation in the field environment but similar to many analogue methods does not provide reliable electrical insulation of the pipe casing elements.

The most appropriate technical solution with reference to the suggested arrangement and method is leakage detection instrument in the pipelines (patent for invention RU 2599403, published 10 Oct. 2016, F17D 5/04, G01M 3/16), with the metal protection casing coaxially installed with annular space on the metal pipe, electrical contacts for the metal protection casing and measuring instrument with electrical conductors connected to the metal pipe and the electrical contacts of the metal protection casing for determination of the electrical resistance in the annular space, wherein, for high accuracy of determination of a leakage point in the pipe, the protection casing comprises separate metal sheets arch shaped segments bent across the pipe, whose straight line edges are connected with each other and with a dielectric washer and arch edges are connected with each other by means of a dielectric ring, wherein there is a ring groove on its flank for arch shaped sheet edges installation with electric contacts in it for each arch shaped sheet edge fixation and metal protective casing electric contacts installed on the outer surface of the ring which are connected to each electric connector separately. Assembly of such casing shall be arranged point-to-point for the casing elements as follows: A dielectric ring is installed on the pipe. A curved edge of the first bent sheet is introduced into the circular groove of the dielectric ring. Two dielectric spacers with cavities from both sides are set onto in-line edges of the sheet. The following adjacent sheet shall be inserted into the installed dielectric ring and spacer. The following dielectric spacer is set onto a free in-line edge of the sheet, afterwards the following metal sheet. The process is repeated until the adjacent closing curved sheet is inserted into two left opening of the dielectric spacers. Then, the closing curved sheet is moved along the pipe through in-line cavities of the dielectric spacers until its edge comes into circular groove of the already installed dielectric ring Then, the following dielectric ring is set on the pipe, which circular groove is set on free non-rectilinear edges of already installed sheets, and the whole process is repeated until the casing is fully installed.

Such method ensures electrical insulation of the adjacent archwise bent metal sheets which allows detection of leakages in the pipelines but its drawbacks are as follows:

1. Structural complexity of the casing assembled from a large number of electrically-insulating connecting elements (dielectric rings and spacers) and metal sheets with flanged edges transversally bent along the pipe which entails strict requirements to accuracy of production for both separate parts of the casing structure and the casing structure assembled (especially, rotationally) as well as assembly complexity of such arrangement.

2. Inadequate reliability of fastening of the arched edges of the adjacent sheets in the cavities of the dielectric rings and spacers which may lead to disconnection of the adjacent metal sheets and therefore affect the operation security of the pipeline due to impossibility of detection and control over leakages in this section.

DISCLOSURE OF THE INVENTION GROUP

The invention group is designed for development of a pipe heat insulation casing consisted of metal elements and assembly method ensuring reliable electrical insulation of all elements.

The technical result of the invention group shall represent improving safety of pipe operation due to reliable operation of leakage detection instrument in the pipelines with adequate fastening and electrical insulation of the adjacent cylindrical metal elements of the heat insulation casing.

The technical result is achieved by the fact of available connection of the metal elements with mutual overlapping in the known pipe heat insulation casing arranged in the form of the cylindrical metal elements serially connected with each other by electrically-insulating spacers, and the metal elements in the lapping area have openings where electrically-insulating spacers are located providing a capability of filling the openings in the lapping area of the metal elements in case of further compression.

It is preferable to use electrically-insulating spacers made of resilient, elastic-plastic or plastic material.

It is reasonable to arrange electrically-insulating spacers made of fully viscous or partially solidified material.

It is rational to spread a glue onto a surface of the electrically-insulating spacers.

It is preferable to make electrically-insulating spacers of double sided stick tape.

It is rational to arrange the openings in the mutual overlapping area of the metal elements with flanges directed away from a contact surface.

It is recommended to arrange the metal elements in the form of sheets archwise bent across the pipe with straight-line edges of the sheets being connected with each other by fasteners.

It is reasonable to arrange connection of the straight-line edges of the sheets with each other by means of self-tapping screws.

The technical result is also achieved by installation of the metal elements with overlapping in the known assembly method of pipe heat insulation casing characterized by serial installation of cylindrical metal elements on the pipe with connection by means of electrically-insulating spacers, the perforation openings are provided in the cylindrical metal elements in mutual overlapping areas and electrically-insulating spacers are laid between the cylindrical metal elements in the mutual overlapping areas providing the capability of filling the perforation openings of the cylindrical metal elements in the mutual over lapping areas in case of further compression.

It is preferable to arrange the metal elements in the form of metal sheets archwise bent across the pipe straight-line edges of which are connected with each other by means of self-tapping screws wherein the assembly compression of the metal elements shall be performed by tightening up by means of wire or loop and clamp by means of self-tapping screws.

It is rational to arrange electrically-insulating spacers made of resilient material.

It is recommended to arrange electrically-insulating spacers made of elastoplastic material.

It is reasonable to arrange electrically-insulating spacers made of plastic material.

It is rational to arrange electrically-insulating spacers made of fully viscous or partially solidified material.

It is preferable to arrange electrically-insulating spacers of double sided stick tape.

It is recommended to arrange electrically-insulating spacers from joint sealant with possibility of full or partial polymerization.

Below there is description of one of many possible configurations of pipe heat insulation casing, options which are identifiable to one inventive conception expressed in the following formula of the invention group.

Description and accompanying drawings illustrate the invention group which can not be considered as limits for the volume of invention.

Various specific details are described intentionally for an overall comprehension of the invention group. But in some cases well known or traditionally used elements are not described to keep description clear.

If other is not stated, all technical and scientific terms used in this description have their meanings that are widely adopted among specialists engaged in the technical sphere of the invention group.

BRIEF DESCRIPTION OF DRAWINGS

Invention group is explained by the drawings, wherein.

Figure 1:
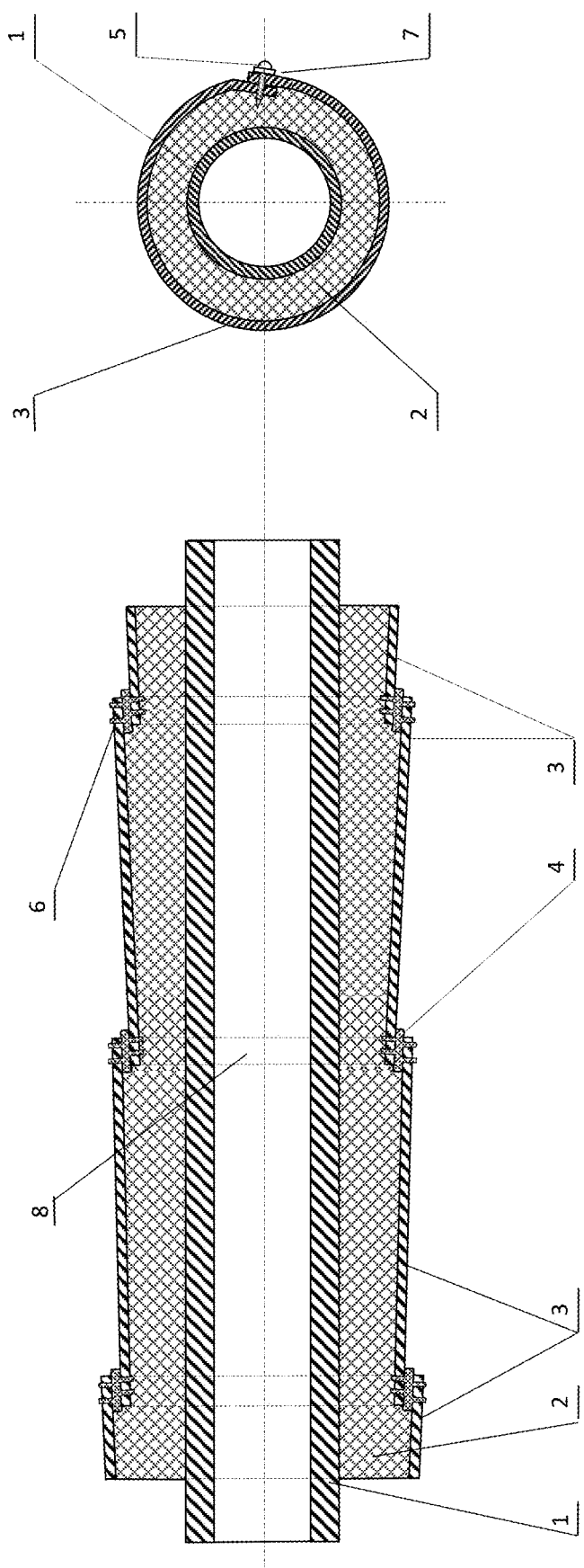
FIG. 1 shows two views of the pipe heat insulation casing in the preferred option.
Figure 2:
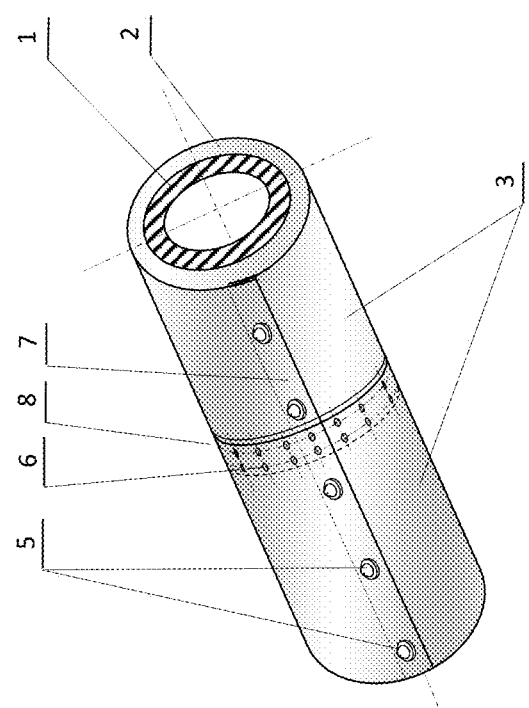
FIG. 2 shows general view of connection of adjacent metal elements of the pipe heat insulation casing in the preferred option.
Figure 3:
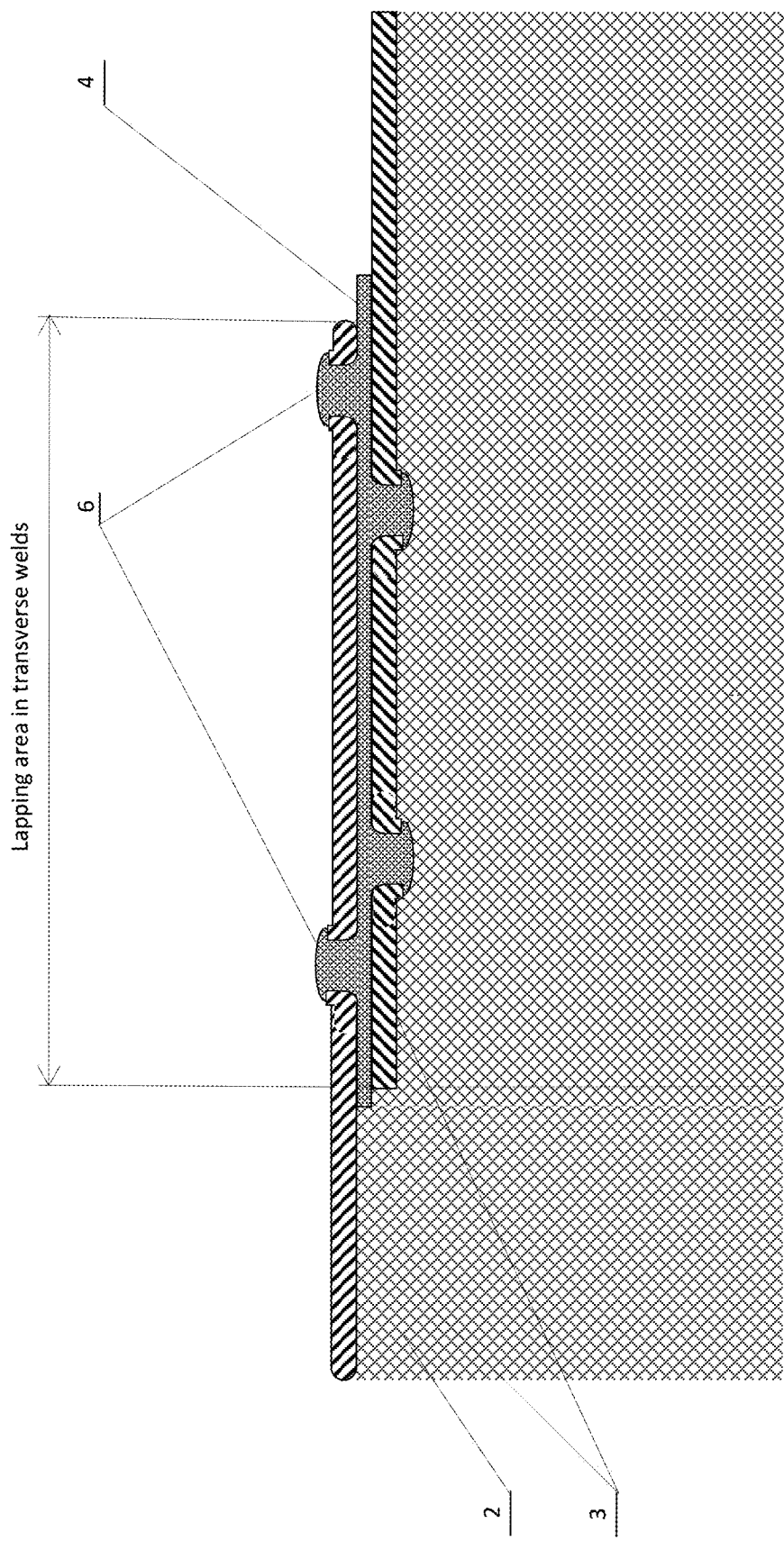
FIG. 3 shows cross-section view of connection of transverse weld of adjacent metal elements of the pipe heat insulation casing in the preferred option.
Figure 4:
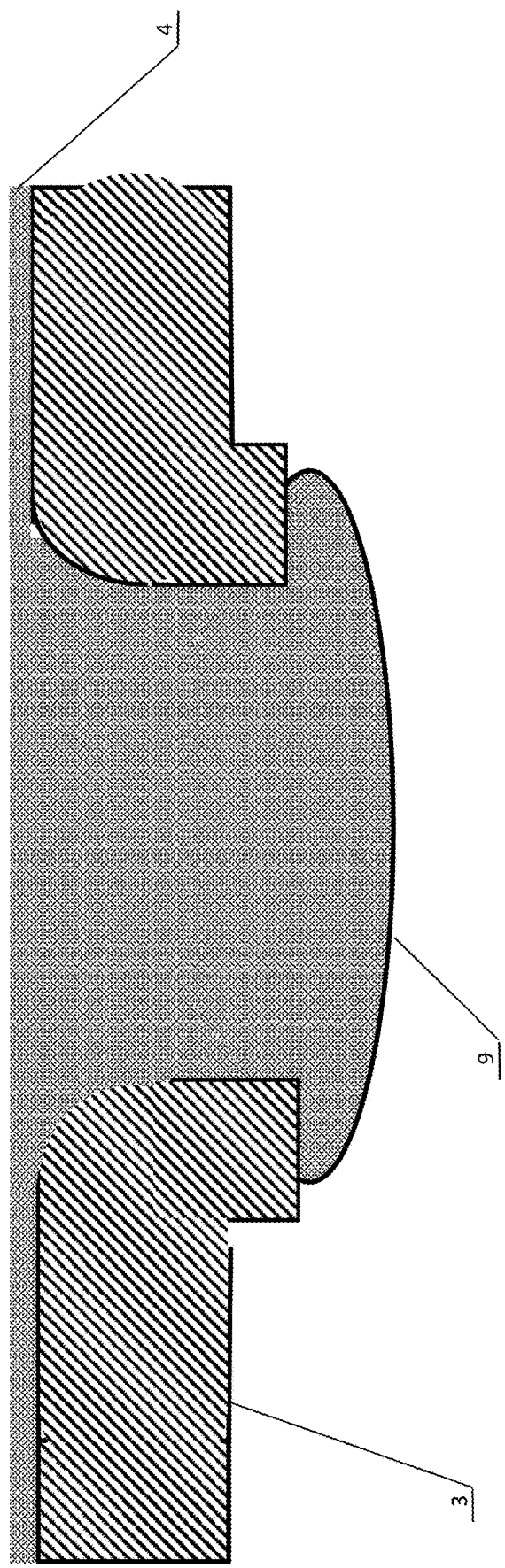
FIG. 4 shows cross-section view of perforation openings with flanges and pin with head.

The pipe heat insulation casing in the preferred option consists of metal elements 3 mounted above the pipe 1 covered by heat insulation 2. The self-tapping screws 5 connect the metal sheets composing the metal elements in longitudinal welds 7. In the lapping areas in longitudinal welds 8 have perforation openings 6. Along longitudinal weld 8 in the lapping area the adjacent metal elements 3 of the casing are divided by electrically-insulating spacers 4. In case of assembly compression the perforation openings 6 are filled with metals of the electrically-insulating spacers 4 going over the edges of the surfaces of the casing metal elements 3. Wherein the prominent material may lead to formation of heads 9. Due to this the electrically-insulating spacers 4 shall provide both electrical insulation of the adjacent metal elements 3 of the casing and mechanical connection. Formation of the heads 9 out of the material of the electrically-insulating spacers 4 shall increase reliability of connection of the metal elements 3 in transverse welds 8. Moreover, in case of external mechanical effects to the pipeline the heat insulation casing ensures protection for the heat insulation 2 due to structural stiffness which is provided during assembly.

DETAILED DESCRIPTION OF INVENTION

Hereby, the construction of the heat insulation casing shall consist of separate elements reliably electrically insulated which may be applicable in detection of the pipe leakages by means of monitoring of the heat insulation electrical resistance.

Assembly of the pipe heat insulation casing is arrange during its installation on the pipe 1. Wherein the metal elements 3 are installed in sequence on the pipe 1 after covering by the heat insulation 2. The metal elements 3 of the casing are made of metal sheets and become of the final structural shape and stiffness upon coming closing cylinders (cylinder shells) by means of connection with self-tapping screws 5 in longitudinal welds 7 in the lapping areas. The adjacent metal elements 3 with perforation openings 6 in the lapping areas 8 in longitudinal welds of the pipe heat insulation casing are connected with each other by means of electrically-insulating spacers 4 formed multiple pin connections in the perforation openings 6. For this the material of the spacer is set in the free lapping area 8 installed on pipe 1 of the metal element 3 with possibility of filling the perforation openings 6 in the lapping area 8 in case of pressing. In the various forms of the invention this material may be made of resilient, elastic-plastic, plastic material in the form of double stick tape or in the preferred option in the form of fully viscous or partially solidified material. Wherein an electrically-insulating spacer 4 is set as provided on the metal element 3 (prior installation on pipe 1). Then the following metal element 3 is installed on the pipe 1 in such a way that its lapping area 8 was located in the lapping area 8 of the previous metal element 3 with a spacer 4. Afterwards, assembly compression of the metal element 3 is performed (by means of wire or hood with further fixation by self-tapping screws 5) in such a way that to ensure full contact in the lapping area 8 and filling by electrically-insulating material by the spacers 4 of the perforation openings 6 in the lapping area 8 of the adjacent metal elements 3, thus finally forming electrically-insulating spacer 4 with pin connections in the lapping area 8 of the metal elements 3. Therein this electrically-insulating material of the spacers 4 at filling of the openings 6 is forming heads 9 with additional fixation at flanges of the metal elements. Hereby, the arranged electrically-insulating spacer 4 provides reliable insulation of the adjacent metal elements 3 and ensure its reliable mechanical connection with each other. Then the following metal element 3 is installed in such a way that its lapping area 8 was located in the lapping area 8 of the previous metal element 3 with a electrically-insulating spacer 4 and then assembly compression is arranged. All steps described above shall be repeated until complete installation of the heat insulation casing.

As resilient, elastic-plastic or plastic material for arrangement of the electrically-insulating spacer 4 may be used polymeric material with relevant characteristics.

In one of the options of the invention group the electrically-insulating spacer 4 may be arrange in the form of thick (e.g. from 2 to 5 mm) double stick tape (e.g. scotch tape with adhesive layer on both sides) which is put on the outside of the lapping area 8 of the metal element 3, afterwards the next metal element 3 during assembly is fixed already outside to the same electrically-insulating spacer 4 in its lapping area 8. And so forth.

As fully viscous or partially solidified material for arrangement of the electrically-insulating spacer 4 there may be used liquid seal a layer of which is applied to the lapping area 8 of the metal element 3, afterwards this layer partially (or fully) polymerized and arranges a spacer 4, then the next metal element 3 is installed outside to this electrically-insulating spacer 4 which was arranged due to polymerization of the sealing layer. And so forth. As such sealing may be used fire-resistant neutral silicone joint sealants "Siloterm EP-6" and "Siloterm EP-71".

INDUSTRIAL APPLICABILITY

A pipe heat insulation casing and erection method allows to boost security of operation of the pipe with heat insulation and shall be applied in nuclear power industry, heat power engineering, manufacturing engineering, petrochemistry, water supply, chemical and aerospace industries as well as other fields.

The invention claimed is:

1. A pipe heat insulation casing comprising:
   electrically-insulating spacers; and
   cylindrical metal elements serially connected with each other by the electrically-insulating spacers, wherein the cylindrical metal elements are installed with a mutual overlapping and provided with perforation openings in areas of the mutual overlapping where the electrically-insulating spacers are located providing a capability of filling the perforation openings in case of further compression.

2. The pipe heat insulation casing according to claim 1, wherein the electrically-insulating spacers are made of resilient, elastic-plastic or plastic material.

3. The pipe heat insulation casing according to claim 1, wherein the electrically-insulating spacers are made of fully viscous or partially solidified material.

4. The pipe heat insulation casing according to claim 1, wherein a surface of the electrically-insulating spacers is covered by a layer of glue.

5. The pipe heat insulation casing according to claim 1, wherein the electrically-insulating spacers are made of a double-sided stick tape.

6. The pipe heat insulation casing according to claim 1, wherein the perforation openings in the areas of the mutual overlapping of the cylindrical metal elements are provided with flanges directed away from a contact surface.

7. The pipe heat insulation casing according to claim 1, wherein the cylindrical metal elements are implemented in a form of sheets archwise bent across the pipe with straight-line edges of the sheets being connected with each other by fasteners.

8. The pipe heat insulation casing according to claim 7, wherein the straight-line edges of the sheets are fastened by self-tapping screws.

9. An assembly method for pipe heat insulation casing, comprising:
    serially installing cylindrical metal elements on a pipe thereby connecting the cylindrical metal elements with each other by means of electrically-insulating spacers, wherein the cylindrical metal elements are installed with mutual overlapping, perforation openings are provided in the cylindrical metal elements in areas of the mutual overlapping, and the electrically-insulating spacers are laid between the cylindrical metal elements in the areas of the mutual overlapping providing the capability of filling the perforation openings of the cylindrical metal elements in the areas of the mutual overlapping in case of further compression.

10. The assembly method for the pipe heat insulation casing according to claim 9, wherein the electrically-insulating spacers are made of resilient, elastic-plastic or plastic material.

11. The assembly method for the pipe heat insulation casing according to claim 9, wherein the electrically-insulating spacers are made of fully viscous or partially solidified material.

12. The assembly method for the pipe heat insulation casing according to claim 9, wherein a layer of glue is applied to a surface of the electrically-insulating spacers.

13. The assembly method for the pipe heat insulation casing according to claim 9, wherein the electrically-insulating spacers are made of double-sided stick tape.

14. The assembly method for the pipe heat insulation casing according to claim 9, wherein the cylindrical metal elements are implemented in the form of metal sheets archwise bent across the pipe with straight-line edges of the sheets being connected with each other by means of self-tapping screws, whereby a mounting crimping of the cylindrical metal elements is performed by tightening up by means of a wire or a clamp with subsequent bracing by the self-tapping screws.

15. The assembly method for the pipe heat insulation casing according to claim 14, wherein the straight-line edges of the sheets are fastened together by the self-tapping screws.

* * * * *